(12) United States Patent
Stollberg

(10) Patent No.: US 6,869,342 B2
(45) Date of Patent: Mar. 22, 2005

(54) DRESSING OF GRINDING TOOLS FOR GEAR GRINDING

(75) Inventor: Horst Stollberg, Lauchringen (DE)

(73) Assignee: Reishauer AG, Wallisellen (CH)

( * ) Notice: Subject to any disclaimer, the term of this patent is extended or adjusted under 35 U.S.C. 154(b) by 116 days.

(21) Appl. No.: 10/189,222

(22) Filed: Jul. 5, 2002

(65) Prior Publication Data

US 2003/0027507 A1 Feb. 6, 2003

(30) Foreign Application Priority Data

Jul. 5, 2001 (DE) .......................................... 101 32 695

(51) Int. Cl.[7] .............................................. B24B 53/00
(52) U.S. Cl. .............................. 451/72; 451/47; 451/56; 125/11.01
(58) Field of Search ............................ 451/72, 47, 56; 125/11.01, 11.04

(56) References Cited

U.S. PATENT DOCUMENTS 2,763,102 A * 9/1956 Staples ........................ 451/159
6,565,418 B1 * 5/2003 Feisel .......................... 451/10

FOREIGN PATENT DOCUMENTS

| DE | 44 16 058 A1 | 11/1995 |
| DE | 196 25 370 C1 | 4/1997 |
| DE | 198 57 592 A1 | 6/2000 |

* cited by examiner

Primary Examiner—Robert A. Rose
(74) Attorney, Agent, or Firm—Browdy and Neimark, P.L.L.C.

(57) ABSTRACT

A dressing apparatus (20) attached to a dressing pedestal (25) of a tooth flank grinding machine is maneuverable by means of an advancer device (27) from a dust proof position of rest aside of the dressing position into an optimum dressing position lying between work spindle (3) and grinding worm (11). Here it can be clamped to the bed with high precision and rigidity. After dressing, it is maneuverable back to the position of rest, in which it hinders neither the grinding process nor the workpiece setting up process.

9 Claims, 2 Drawing Sheets

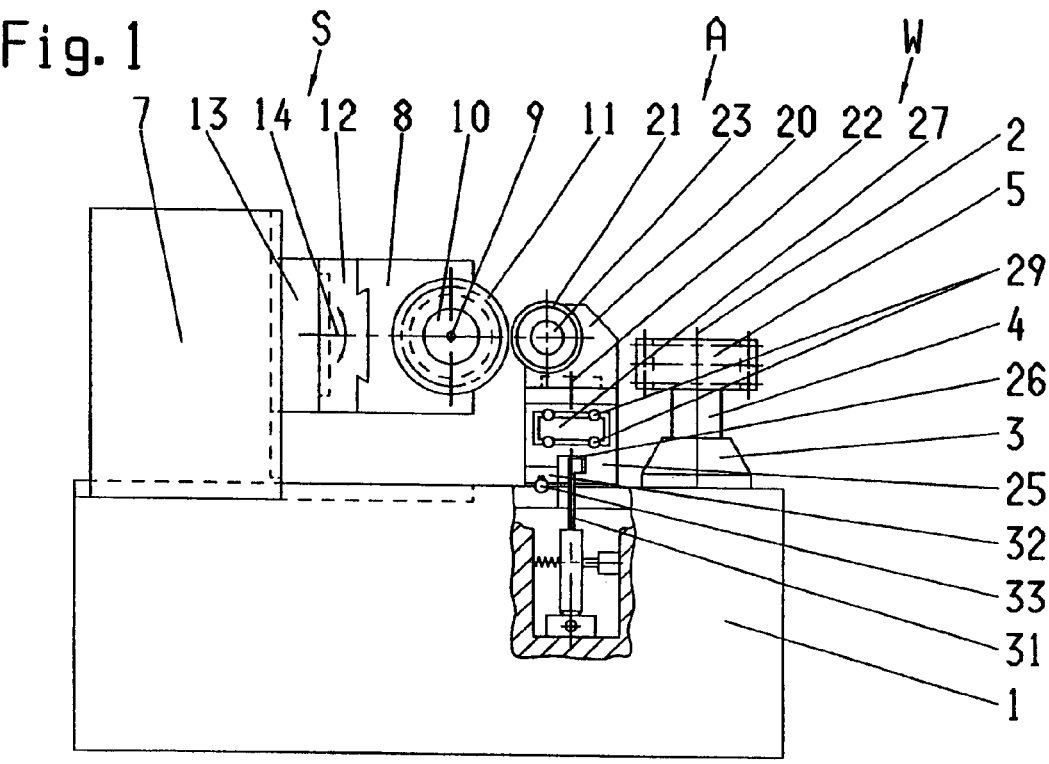
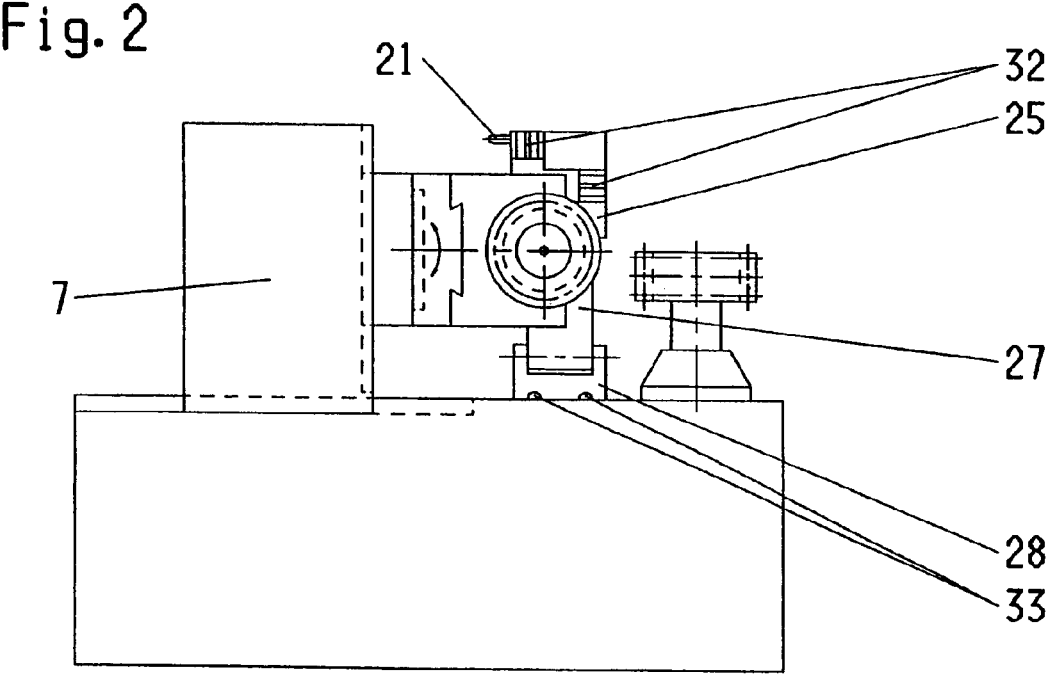

DRESSING OF GRINDING TOOLS FOR GEAR GRINDING

TECHNICAL FIELD

The invention concerns a gear grinding machine. It concerns in particular a grinding machine with grinding worms for the continuous generation grinding of gears.

STATE OF THE ART

If these machines are employed with dressable grinding tools or grinding wheels, which is generally the case, they require a dressing unit by means of which the grinding wheel can be freshly dressed after grinding a certain number of workpieces. Thereby, after the loss in abrasive keenness and shape caused by the grinding process, the abrasive keenness and desired profile of the grinding wheel can be restored. This is usually performed by means of a rotating disc-shaped, hard abrasive coated dressing tool, with which material is removed from the peripheral surfaces of the grinding wheel in several dressing passes, until the grinding wheel profile is completely renewed.

On a number of the known machines operating by the generation grinding method, the dressing tool is arranged on the side of the grinding wheel opposite that of the workpiece, such that the lead and infeed motions of the dressing tool must be produced by motion axes of the machine which serve solely for this function, as with this dressing unit arrangement the machine axes provided for grinding cannot be used for dressing. This leads to a relatively complicated machine construction. A further disadvantage is that the dressing tool is relatively poorly accessible, which makes setting operations difficult.

In DE-A-196 25 370, a solution is suggested by which the dressing unit is located at a point easily accessed by the setter on the end of the machine bed opposite that of the workpiece. This solution affords an optimum accessibility to the dressing unit for setting and changing the dressing wheel, and the advantage that the motion axes of the grinding worm relative to the workpiece can also be employed for producing the dressing actions. This presumes, however, that the grinding worm is located on a pivoting grinding worm holder in order to bring the grinding worm into position for dressing. The disadvantage of this pivoting arrangement is the high expense.

DE-A-198 57 592 describes a tooth flank grinding machine on which the dressing unit is located on a turntable together with two work spindles. By swivelling the turntable the dressing unit can be brought into a position in which the dressing wheel is frontally facing the grinding worm, such that its motion axes can be employed for grinding as well as for dressing. A turntable of such stiffness and precision as are necessary for the dressing of a grinding worm and the grinding of gears demands resources which, on a machine with only one work spindle, are not justifiable.

DE-A-44'16'058 discloses a dressing tool, which is arranged on a CNC-controlled slide. To perform dressing, the tool is brought from an end position into a dressing area. The grinding disk supposed to be dressed is also brought in a CNC-controlled way from a grinding area into the dressing area.

SUMMARY OF THE INVENTION

It is an object of the present invention to create a gear grinding machine which obviates the above-mentioned disadvantages.

This object is attained with a gear grinding machine having the features of claim 1.

The gear grinding machine according to the invention is provided with a dressing unit which can be infed by way of an infeed unit to a dressing position between a work fixture unit and a grinding tool fixture unit, where means is provided to position-and clamp the dressing unit with high precision and rigidity on the bed.

The gear grinding machine according to the invention makes it possible for the dressing unit to be located during dressing in an optimum position for dressing with respect to stiffness, thermal deformation of the machine, exploitation of the machine axes and accessibility. An advantage is that the same motion axes of the grinding tool can be used for grinding as well as for dressing, without the need for a turntable or pivoting tool holder. A further advantage is that when not in use the dressing tool can be brought into a dirt proofed position of rest, in which the dressing unit moreover hinders neither the grinding process nor the workpiece setting up process.

In a preferred embodiment the dressing unit is arranged pivotable about an axis preferably parallel to an infeed motion between a grinding tool and a work piece.

Further advantageous embodiments are indicated in the dependent claims.

BRIEF DESCRIPTION OF THE DRAWING

In the following the solution according to the invention is described in detail via the example of a tooth flank generation grinding machine, referring to the drawings. These show:

FIG. 1 a side elevation of a diagrammatically represented tooth flank generation grinding machine ready for dressing, and FIG. 2 the machine according to FIG. 1 ready for grinding, and FIG. 3 an elevation of a dressing unit of a machine according to FIG. 1 ready for dressing.

PREFERRED EMBODIMENTS OF THE INVENTION

Figure 3:
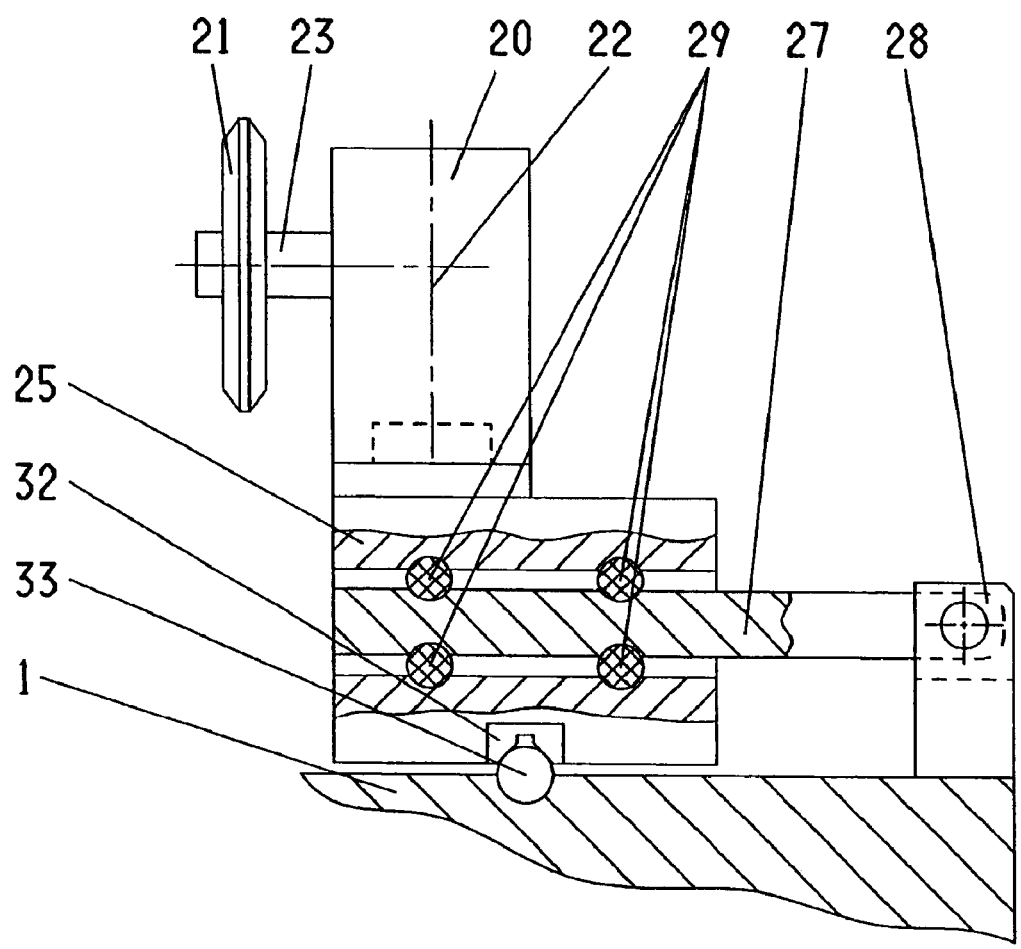

The tooth flank generation grinding machine shown in FIG. 1 comprises a machine bed 1 with a work fixture unit W and a grinding tool fixture unit S. The work fixture unit W consists of a work spindle 3 located in the machine bed 1 for rotation about a first axis 2, and a mandrel 4 for accommodating a workpiece 5.

The grinding tool fixture unit S consists of an infeed slide 7 located on the machine bed 1, which said slide is movable at right angles to the work spindle axis 2. The work fixture unit W and the grinding tool fixture unit S define a working area. In another constructional form the work fixture unit is arranged on an infeed slide and is movable relative to the grinding tool fixture unit.

Opposite the workpiece 5, and located in a grinding slide 8 for rotation about a second axis 9 is a grinding spindle 10 with a grinding tool attached to it, in this case a grinding wheel or a grinding worm 11. The grinding slide 8 is movable parallel to the grinding spindle axis 9 on a swivel head 12. The swivel head 12 is swivellable about a first pivot axis 14 at right angles to the work spindle axis 2 on a vertical slide 13. The vertical slide 13 is guideway located on the infeed slide 7 for movement parallel to the work spindle axis 2.

The tooth flank generation grinding machine is further provided with a dressing unit A. The dressing unit A comprises a dressing apparatus 20 and a dressing pedestal 25, the dressing apparatus 20 being fitted to the dressing pedestal 25. The dressing apparatus 20 is provided with a motor driven dressing spindle 23 which is swivellable about a second pivot axis 22 preferably parallel to the work spindle axis 2. Clamped to this dressing spindle 23 is a dressing tool, preferably a dressing wheel 21 coated with hard abrasive grains.

According to the invention, to perform dressing the dressing pedestal 25 is brought from a position of rest outside the working area into the working area of the machine, clamped in exact position on the machine bed 1, and removed from the working area again after dressing. FIG. 1 and FIG. 3 show the working position of the dressing unit A, FIG. 2 shows the position of rest.

In the sample construction shown here, the advance and withdrawal of the dressing pedestal 25 is effected by means of a swivel arm 27 attached to the machine bed 1 by a swivel bearing 28. Depending on the form of the working area, however, other means of advance and withdrawal of the pedestal 25 are also feasible.

The dressing pedestal 25 is located on the swivel arm 27 in elastic elements 29, in particular elastically deformable balls. Other suitable elastic elements 29 are elastically deformable tapes, springs or the like. During grinding the dressing pedestal 25 with the attached dressing apparatus 20 is in a dirt proof position at the back of the working area. For dressing, after retraction of the grinding worm 11 from its grinding position, it is swivelled automatically into the working area and brought to dressing position between work spindle 3 and grinding worm 11. For the automatic swivel action, actuator elements, hydraulically driven motors or the like can be employed. To ensure a high positioning accuracy and a rigid, wear resistant connection between pedestal 25 and machine bed 1, centring and clamping elements are provided. As clamping element a hydraulically actuated drawbar 31 arranged in the machine bed 1 acts directly on the machine bed 1. The drawbar 31 engages with its top hydraulically latching/delatching elbow element in a slot 26 let into the dressing pedestal, and after engaging in the slot 26 pulls the dressing pedestal 25 onto centring elements. For centring elements, hardened steel prisms 32 are provided on the underside of the dressing pedestal, and in the machine bed 1 appropriately positioned hardened steel balls 33, which are cleaned with coolant/lubricant or compressed air prior to the clamping of the pedestal 25. The pedestal 25 located elastically on the swivel arm 27 is pre-positioned such that to attain the exact dressing position defined by the support points only a minor displacement and minor forces are required.

After dressing, the clamping of the pedestal 25 is released automatically, the drawbar 31 delatched hydraulically, and the working area cleared for grinding again by swivelling the pedestal 25 back to its starting position.

To set up the dressing process the dressing unit A is swivelled to the working position well accessible for the setter.

By the solution according to the invention, it is achieved that during dressing the dressing unit is in the optimum position for dressing with respect to stiffness, thermal deformation of the machine, exploitation of the machine axes, and accessibility, and yet does not hinder the grinding process.

LIST OF REFERENCE SYMBOLS

W Work fixture unit
S Grinding tool fixture unit
A Dressing unit
1 Machine bed
2 First axis, work spindle axis
3 Work spindle
4 Mandrel
5 Workpiece
7 Infeed slide
8 Grinding slide
9 Second axis, grinding spindle axis
10 Grinding spindle
11 Grinding worm
12 Swivel head
13 Vertical slide
14 First swivel axis
20 Dressing apparatus
21 Dressing disc
22 Second swivel axis
23 Dressing spindle
25 Dressing pedestal
26 Slot
27 Swivel arm
28 Swivel bearing
29 Elastic elements
31 Drawbar
32 Steel prisms
33 Steel balls

What is claimed is:

1. In a gear grinding machine with
a machine bed,
a work fixture unit connected to the machine bed for setting up a workpiece, a grinding tool fixture connected to the machine bed for setting up a grinding tool, an infeed slide arranged on the machine bed for infeeding the grinding tool to the workpiece or for infeeding the workpiece to the grinding tool, and a dressing unit connected to the machine bed for accommodating a dressing tool, wherein the dressing unit is connected to an advancer unit by means of which it can be advanced to a dressing position in a working area of the machine between the work fixture unit and the grinding tool fixture unit, and means are provided for the positioning and clamping of the dressing unit in the dressing position, and wherein the advancer unit comprises a swivel arm which is connected to the machine bed by means of a swivel bearing.

2. In a gear grinding machine with a machine bed, a work fixture unit connected to the machine bed for setting up a workpiece, a grinding tool fixture connected to the machine bed for setting up a grinding tool, an infeed slide arranged on the machine bed for infeeding the grinding tool to the workpiece or for infeeding the workpiece to the grinding tool, the workpiece to the grinding tool, and a dressing unit connected to the machine bed for accommodating a dressing tool, wherein: the dressing unit is connected to an advancer unit by means of which it can be advanced to a dressing position in a workpiece area of the machine between the work fixture unit and the grinding tool fixture unit, and means are provided for the positioning and clamping of the dressing unit in the dressing position, wherein the dressing unit is connected to the advancer unit by means of elastic elements, whereby by means of this advancer unit the dressing unit can be brought at least approximately into the dressing position.

3. In a gear grinding machine with a machine bed, a work fixture unit connected to the machine bed for setting up a workpiece, a grinding tool fixture connected to the machine bed for setting up a grinding tool, an infeed slide arranged on the machine bed for infeeding the grinding tool to the workpiece or for infeeding the workpiece to the grinding tool, and a dressing unit connected to the machine bed for accomodating a dressing tool, wherein: the dressing unit is connected to an advancer unit by means of which it can be advanced to a dressing position in a workpiece area of the machine between the work fixture unit and the grinding tool fixture unit, and means are provided for the positioning and clamping of the dressing unit in the dressing position, wherein the dressing apparatus can be swivelled about an axis parallel to a work spindle axis.

4. In a gear grinding machine with a machine bed, a work fixture unit connected to the machine bed for setting up a workpiece, a grinding tool fixture connected to the machine bed for setting up a grinding tool, an infeed slide arranged on the machine bed for infeeding the grinding tool to the workpiece or for infeeding the workpiece to the grinding tool, and a dressing unit connected to the machine bed for accomodating a dressing tool, wherein: the dressing unit is connected to an advancer unit by means of which it can be advanced to a dressing position in a workpiece area of the machine between the work fixture unit and the grinding tool fixture unit, and means are provided for the positioning and clamping of the dressing unit in the dressing position, wherein the means of positioning the dressing unit comprise hardened prisms and hardened balls, which can be brought into effective mutual engagement.

5. In a gear grinding machine with a machine bed, a work fixture unit connected to the machine bed for setting up a workpiece, a grinding tool fixture connected to the machine bed for setting up a grinding tool, an infeed slide arranged on the machine bed for infeeding the grinding tool to the workpiece or for infeeding the workpiece to the grinding tool, and a dressing unit connected to the machine bed for accommodating a dressing tool, wherein: the dressing unit is connected to an advancer unit by means of which it can be advanced to a dressing position in a workpiece area of the machine between the work fixture unit and the grinding tool fixture unit, and means are provided for the positioning and clamping of the dressing unit in the dressing position, wherein the means of positioning the dressing unit comprise a hydraulically actuated drawbar and a slot, the drawbar being arranged in the machine bed and the slot being arranged in the dressing unit, and wherein in the dressing position the drawbar engages in the slot under spring pressure, so that after hydraulic tensioning of the drawbar the dressing unit is pulled against the machine bed.

6. The machine according to claim 1, wherein the advance of the grinding tool to the workpiece is effected at right angles to the work spindle axis, wherein a grinding slide is arranged on the infeed slide to produce a relative motion between grinding tool and workpiece parallel to a grinding spindle axis, wherein a swivel head is arranged on the infeed slide to produce a swivel action of the grinding tool about a first swivel axis at right angles to the grinding spindle axis and wherein a vertical slide is arranged on the infeed slide to produce a relative motion between grinding tool and workpiece parallel to a work spindle axis.

7. The machine according to claim 1, wherein the dressing unit comprises a dressing apparatus and a dressing pedestal.

8. In a gear grinding machine with a machine bed, a work fixture unit connected to the machine bed for setting up a workpiece, a grinding tool fixture connected to the machine bed for setting up a grinding tool, an infeed slide arranged on the machine bed for infeeding the grinding tool to the workpiece or for infeeding the workpiece to the grinding tool, and a dressing unit connected to the machine bed for accommodating a dressing tool, wherein the dressing unit is connected to an advancer unit by means of which it can be advanced to a dressing position in a working area of the machine between the work fixture unit and the grinding tool fixture unit, and means are provided for the positioning and clamping of the dressing unit in the dressing position, and wherein cleaning agents are provided which clean at least one part of the means of positioning the dressing unit with coolant/lubricating agent or by air blast.

9. The machine according to claim 1, wherein the dressing position of the dressing unit is a position in which the dressing unit can perform dressing of the grinding tool.

* * * * *